United States Patent

Ekman

[11] Patent Number: 5,961,159
[45] Date of Patent: *Oct. 5, 1999

[54] QUICK-COUPLING PART ARRANGEMENT

[75] Inventor: Thure Ekman, Skovde, Sweden

[73] Assignee: Dart Engineering AG, Zug, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/628,385

[22] Filed: Apr. 5, 1996

[30] Foreign Application Priority Data

Apr. 27, 1995 [SE] Sweden ..................................... 9501563

[51] Int. Cl.⁶ ............................................. F16L 37/22
[52] U.S. Cl. ........................... 285/305; 285/316; 285/422; 285/916; 75/530
[58] Field of Search ....................... 137/614.03; 285/316, 285/305, 422, 916; 75/530

[56] References Cited

U.S. PATENT DOCUMENTS

| 2,863,679 | 12/1958 | Dunbar | 285/916 |
| 3,817,560 | 6/1974 | Guertin | 285/90 |
| 3,836,114 | 9/1974 | Norton | 285/316 |
| 3,866,957 | 2/1975 | Norton | 285/316 |
| 4,289,164 | 9/1981 | Ekman . | |
| 4,468,309 | 8/1984 | White | 285/422 |
| 4,474,651 | 10/1984 | Yauchi et al. | 285/422 |
| 4,779,645 | 10/1988 | Ekman | 137/614.03 |
| 4,881,763 | 11/1989 | Guido et al. | 285/916 |
| 5,076,325 | 12/1991 | Ekman | 137/614.03 |
| 5,159,955 | 11/1992 | Ekman | 137/614.03 |
| 5,335,947 | 8/1994 | Remsburg | 285/316 |
| 5,467,964 | 11/1995 | Ekman | 137/614.03 |
| 5,547,233 | 8/1996 | Hoegger | 285/422 |

FOREIGN PATENT DOCUMENTS

| 2 558 927 | of 1985 | France . | |
| 1 904 927 | 8/1970 | Germany . | |
| 2 344 356 | 3/1974 | Germany . | |
| 478161 | 7/1975 | U.S.S.R. | 285/916 |

*Primary Examiner*—Eric K. Nicholson
*Attorney, Agent, or Firm*—Pollock, Vande Sande & Amernick

[57] ABSTRACT

A first quick-coupling part can be brought into interaction with a second quick-coupling part via an interaction portion. The quick-coupling parts are held together with locking members. The interaction portion is designed with a surface layer which brings about an essentially crack-free flexibility for the locking members in spite of high actuating forces. One or more underlying layer(s) has (have) greater hardness than the surface layer, and the combination of said layers gives the necessary resistance against high media pressure.

12 Claims, 3 Drawing Sheets

QUICK-COUPLING PART ARRANGEMENT

TECHNICAL FIELD

The present invention relates to an arrangement of a first quick-coupling part which can be brought into interaction with a second quick-coupling part via an interaction portion, in which, in an interaction, the parts can be held together at even high media pressure or media pressure peaks. High pressure or pressure peaks in this case mean 1000 bar or more. The holding together is effected by means of locking members which in this case can consist of locking balls, locking heels, bayonet arrangements etc. which can interact with said portion in a locking of the quick-coupling parts.

BACKGROUND OF THE INVENTION

The invention can be applied to various types of quick couplings which have to withstand high pressure or pressure peaks. As an example, mention can be made of the quick coupling according to the U.S. Pat. No. 4,289,164 which has an insertion nipple which can be introduced into a female part and locked to the latter with the aid of locking members in the form of a number of locking balls. The insertion nipple constitutes a part of the male coupling part of the quick coupling, to which the insertion nipple can be fastened by means of joints, e.g. threaded joints, and sealed by means of seals. The insertion nipple must, among other things, be made with a hardness which withstands the high pressure and the safety standards associated therewith. Such standards require that the coupling has to withstand, in practice, pressure which is 3–4 times higher than nominal. This means that the insertion nipple of the high-pressure coupling is, in general, made with a hard surface layer and relatively large dimensions.

DESCRIPTION OF THE INVENTION

TECHNICAL PROBLEM

The surface hardness in e.g. the nipple and its threaded joint leads to a number of disadvantages. At high pressure, the nipple has a tendency to crack in the surface layer. The cracks widen during ongoing use and, in the end, lead to the nipple's collapsing under the high pressure or pressure peaks in question. The aim of the invention is, among other things to prevent such crack formation and thus increase the power of resistance of the quick-coupling component in question against the high pressure or pressure peaks.

The crack formation can be initiated by locking members which are force-stressed as a result of the pressure loading by the medium, stresses from the threaded connections of the nipple in the case of conical threads, external stress forces, etc. The locking members, or locking balls cause very great point loads in the surface layer of the nipple or equivalent surface layer. These point loads encourage crack formation, which gradually worsens. The hard surface layer, for its part, can undesirably damage the locking members which can undergo functional impairment as a result of this. The invention to solves this problem also.

In certain situations, there is a need to be possible for the quick coupling to have conventional dimensions in spite of the fact that it can bring about, and be resistant to, relatively high pressure. The invention solves this problem also.

In association with the interaction or the locking of the quick-coupling parts, it is desired that contact function between the locking member in question (ball, hook etc.) and the surface of the nipple or equivalent, can work with an extensive surface contact function, i.e. prevent a pure and simple single-point interaction. The aim of this is that the ball, hook or equivalent is to be able to bear or take up a relatively great load without deformation, crack formation etc. appearing. The invention solves this problem also.

There is a desire that it be possible to prevent the appearance of microcracks in the nipple and/or the locking member material, which microcracks can constitute indications of breakage on subsequent pressure increases. The aim with the prevention of microcrack formation is essentially to increase the bursting pressure of the nipple. The invention solves this problem also and eliminates to a very great extent the risk of microcracks, which in practice means that the resistance of the nipple against pressure loads increases no less than 3 times compared with previously proposed corresponding coupling components.

There is also a desire, in the case of threaded connections with conical threads in quick-coupling parts, to be able to take advantage of the strength of the material on tightening of the nipple or equivalent component on the other coupling part body in order to obtain satisfactory sealing in the connection thread without risks arising of crack formation. The invention solves this problem also.

The nipple constitutes a component which can be subjected to great external breaking forces which occur as a result of loads on the quick-coupling in its use in practice. Great loads can also be caused by long and heavy connection lines or connection tubes. There is a need for crack formation to be counteracted in the nipple or equivalent also in the case of such great external forces. The invention solves this problem also.

In the manufacture of quick couplings, there is a need for it to be possible to keep the costs of material and production low, and also to use manufacturing methods which are appropriate from the technical point of view. The invention solves this problem also.

The invention indicates a new way in relation to that normally utilized on previously known quick-couplings and in methods of manufacturing these. What can in this connection be considered characteristic of an arrangement according to the invention is that said interaction portion (e.g. nipple) is designed with a surface layer which brings about an essentially crack-free flexibility for the locking members. A further characteristic is that one or more layers underlying the surface layer have greater hardness than the surface layer to produce the necessary resistance against high media pressure.

In a preferred embodiment, the surface layer is designed to allow interaction with a spherical surface on the respective locking member via a cap-shaped part on the latter. The bearing surface of the locking member against the surface layer is thus enlarged considerably in relation to previously known arrangements. In the case of a ball shape of the respective locking member, the cap-shaped part can constitute 1/2000–1/500 of the ball-shaped surface.

The invention can be used in, inter alia, a nipple part which is included in a first quick-coupling part and which can be inserted into the second quick-coupling part (female) via or with the nipple part. The entire nipple, or at least those parts of the nipple which interact with locking members, have the layer arrangement with a surface layer which is less hard than underlying material layers. Extensive interaction contacts can be obtained by means of a relatively soft surface layer. The elasticity in the surface layer is utilized and prevents microcrack formation. The respective contact between the respective locking member (locking ball) and the surface material, of the interaction portion (the nipple) on the occurrence of the relatively high media pressure, or media pressure peaks, results in the locking member's being capable of resting on a cushioning function afforded by the surface material, without considerable crack formation arising. This means that enlargement of the contact surfaces between the locking member and the surface material arises and that there is thus greater bearing capacity through support from underlying harder layers for the locking member.

In a preferred embodiment, the surface layer has a thickness in the range 0.05–0.4 mm, preferably within the range 0.1–0.3 mm. The hardness in the surface layer material is less than the hardness in the underlying layers/core by 10–50 units Hvl (Vickers units with measuring force 1 kp). The surface layer has a hardness of 500–540 Hvl. Underlying layers or the core have/has a hardness of 530–570 Hvl.

In one embodiment, the interaction portion or the nipple is made of toughenable material with adapted carbon and manganese contents. The sulphur normally occurring in such material is, in this case, replaced with lead which is included to avoid sulphide formation which would reduce the transverse strength in the material of the interaction portion or the nipple.

As a result of what is proposed above, the respective locking member can rest on a firm but nevertheless soft cushioning function and thus bear a relatively much greater load compared with the case where the ball or equivalent bears against a hard surface. The nipple or equivalent has the capacity to take up elastic deformations as a result of increased media pressure, which prevents crack formation tendencies. Since the balls are prevented from being deformed, an improved and safer locking function is achieved. It is prevented e.g. that ball deformations cause the ball to stick in its associated bearing hole in the actual coupling part. By means of the invention, good strength is achieved by making use of a combination of hardness and toughness of the material. This combination gives the nipple or equivalent its special abovementioned advantages. The material can consist of conventional machine steel which is toughened. The costs of such material are particularly advantageous, and machining and manufacture can take place without substantially increased complexity.

BRIEF DESCRIPTION OF THE DRAWINGS

A presently proposed embodiment of an arrangement which has the significant characteristics of the invention is to be described below with simultaneous reference to the attached drawings in which.

DETAILED DESCRIPTION OF THE PREFERRED EMBODIMENT(S)

Figure 1:
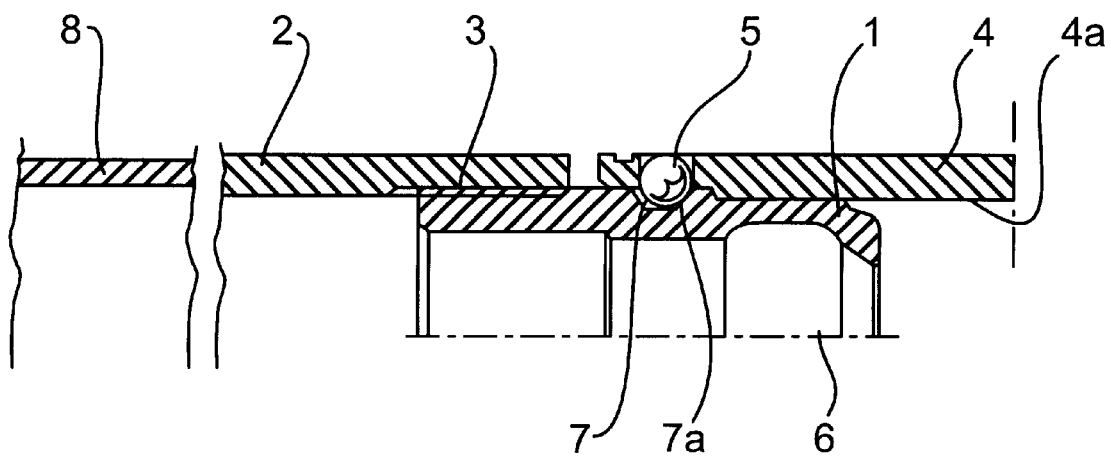
FIG. 1 shows in longitudinal section a quick coupling with male and female parts in coupled-together state, the parts being locked with locking members in the form of locking balls, and also a connection for the male part is shown in principle.

The invention is shown, in association with the drawings, for use in the case of a nipple part 1 which is fastened in a male part body 2 via a threaded joint 3. The male part can be inserted with the nipple part 1 into a female part 4, and female and male parts can be locked to one another in a known manner with locking members in the form of a number of locking balls 5 which are arranged around the periphery of the nipple part and which, in the their respective locking position, are acted upon toward the center line 6 of the quick coupling for interaction with the nipple part via an annular recess 7.

The respective locking ball bears against the surface 7a of the recess 7. Through the coupled-together quick-coupling parts, pressure is supplied in a working medium which preferably consists of hydraulic oil. Connected in a known manner to the male part is a connection line or connection tube 8.

Figure 2:
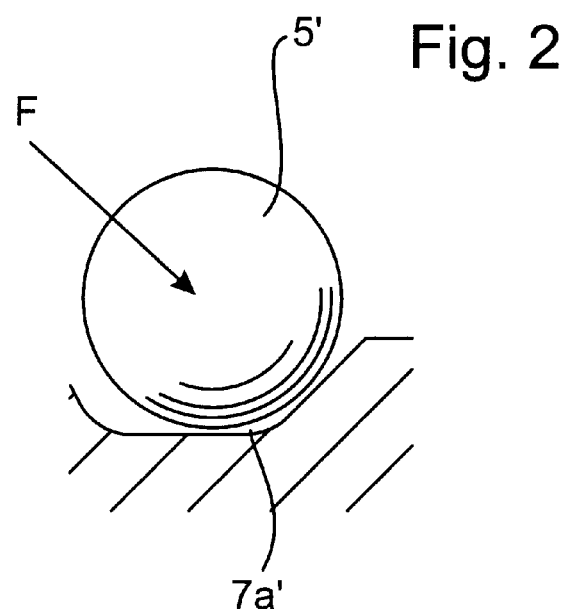
FIG. 2 shows in longitudinal section parts of the locking function according to FIG. 1.

The actuating force F of the ball 5' against the surface 7a' according to FIG. 2 can, according to the above, be considerable.

Figure 3:
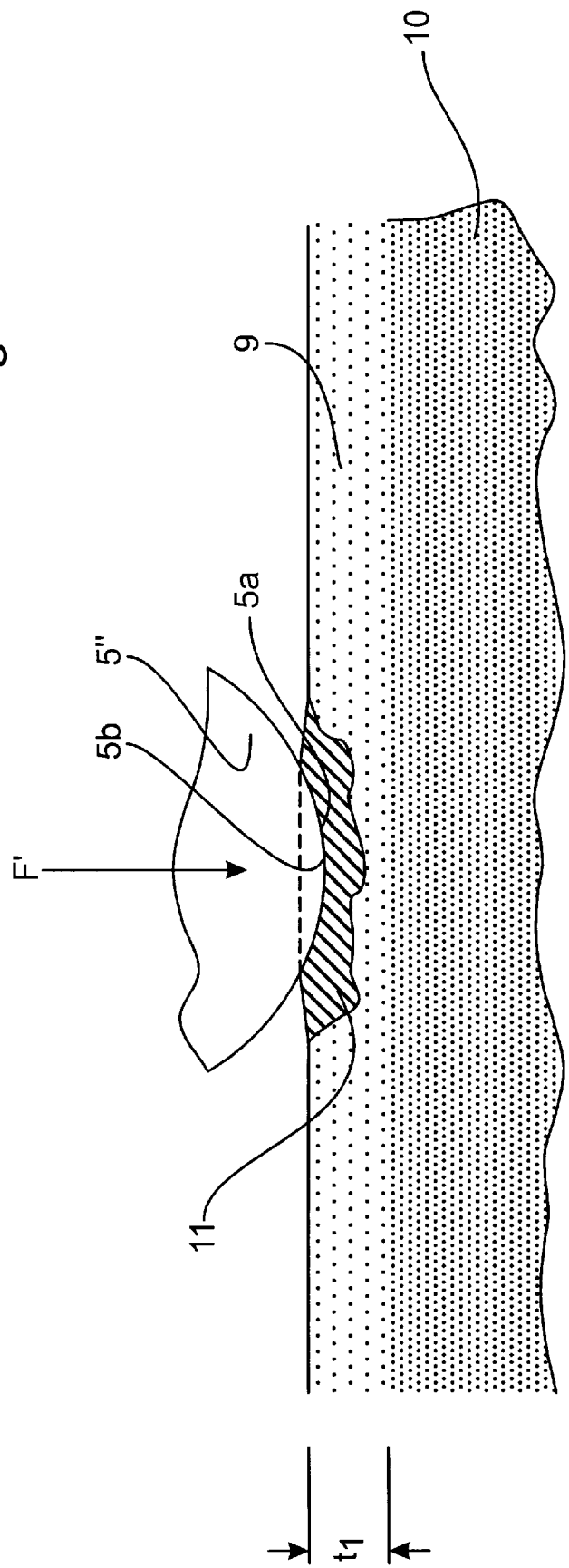
FIG. 3 shows greatly enlarged in longitudinal section how a locking member surface interacts with a surface layer of a nipple part or equivalent in the quick coupling according to FIG. 1 and also underlying layers which are included under the surface layer.

FIG. 3 shows that the material construction of the nipple part comprises a surface layer 9 and one or more underlying layers 10. The surface layer is relatively soft and elastic and this permits the ball 5" to sink into the surface material to establish a contact surface 5a which is extensive, i.e. is increased in comparison with single-point bearing, and is cap-shaped in the example shown. The cap of the ball 5" is, indicated by 5b. The surface layer is in this case, designed so that the sinking of the ball can take place without significant formation of microcracks. The elasticity in the surface material is utilized and brings about a cushioning function formation 11 in the surface layer which increases the bearing capacity for the ball without crack formation in either the surface layer or the ball. The surface layer has a thickness of 0.05–0.4 mm, preferably 0.1–0.3 mm.

Figure 4:
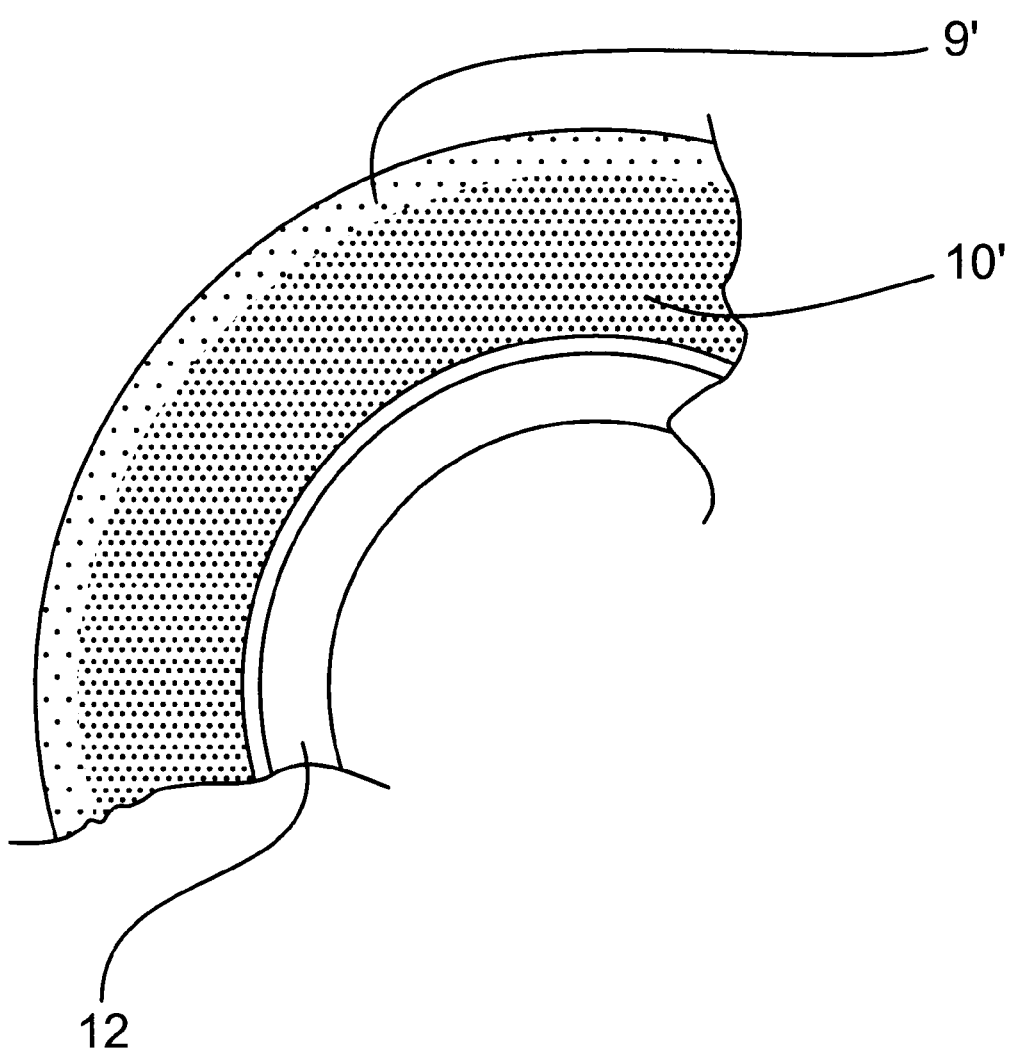
FIG. 4 shows in an end view parts of layers according to FIG. 3.

FIG. 4 shows that there can be a number of underlying layers 10', 12. The female part 4 can be constructed in a similar manner, i.e. have on its inner surface 4a a less hard layer and harder underlying layers. The locking arrangement can be different and may start from locking member bearing in the nipple part with locking members which project into a recess in the female part. The female part alone can, in this case, have the layer arrangement, etc.

To achieve the abovementioned surface layer properties, the material selection for the nipple is important. The material is to allow so-called toughening which means that the material is to have adapted carbon and manganese contents, respectively, for toughening. The addition of sulphur which normally increases the shearability is, in this case, replaced with lead so that sulphide formation which reduces the transverse strength is reduced to a minimum. Heat treatment takes place in a protective gas atmosphere which is entirely ammonia-free. The presence of any ammonia in the protective gas atmosphere reduces the possibility of tempering the material which then remains hard and brittle in spite of the tempering process being carried out.

The surface hardness should to be less than the hardness in underlying layers according to the above, and stated minimum and maximum values respectively are to follow one another in parallel. It is important for the manufacture of the nipple in question, or equivalent component, that the tempering takes place in a temperature range of 200–230° C. which is below the brittleness zone of the material. If the tempering process takes place within the brittleness range of the material, the strength is seriously jeopardized and the material cannot be used in association with the invention. In this connection, use is made of the concept's hardness versus toughness and also brittleness. Good strength, in the context of the object of the invention, is constituted by a combination of hardness and toughness. This combination results in the abovementioned properties which are especially advantageous. The material which is used can consist of conventional machine steel which can be toughened. The price of this is particularly advantageous.

The object of the invention thus comprises a unit (nipple, nipple part, female part etc.) which is manufactured from one and the same substance and which has been surface-treated to achieve a surface layer which is tougher than the layer(s) lying inside or the core according to the above.

A certain spring-back effect can be obtained through the surface layer when the force F' according to FIG. 3 stops. This spring-back effect can take place fully or partly, i.e. correspond fully or partly to the height of the cap. As far as the elasticity or the toughness in the surface layer is concerned, the permitted loading of the material (e.g. machine steel) is to fall below the 0.2 limit. A 5 mm locking ball according to the above can, for example, give a cap-shaped depression in the surface layer where the diameter of the (possibly remaining) depression is approximately 0.5 mm.

The invention is not limited to the embodiment shown above by way of example but can be subjected to modifications within the scope of the following patent claims and the inventive idea. The fabrication of the member (for example the nipple) can start with designing the body in steel with a comparatively low degree of hardness (easy to machine), for example, steel with a carbon content of 0.05–0.15% C. The produced body is then carbonised in furnace atmospheres comprising gas with carbon content (liquefied product). In such a way, the carbon content is increased to 0.4–0.9% in the surface layer which is adapted with a certain thickness, for example 0.4–0.8 mm. After the creation of such a surface layer, the body is heat treated (see above) to decrease the hardness, for example to 10–50 HVl, in the outer layer portion of the surface layer. The outer layer portion can be selected to be 0.05–0.4 mm, preferably 0.1–0.2 mm, thickness. In such a way, it creates an outer layer with less hardness according to the inventive idea supported by an underlying layer with higher hardness. Under the last mentioned layer the hardness of the material is less than the hardness of the underlaying layer. By this process and features, the concerned body member of the quick coupling can be manufactured at low cost and uncomplex techniques.

What is claimed is:

1. A quick coupling connection between first (4) and second (1) coupling means which are in sliding relation to each other comprising:

said first coupling means (4) supporting thereon at least one bearing element (5), said second coupling member (1) having at least one means (7) for engaging with said at least one bearing element when said first and second coupling means are in their coupled relation, said engaging means (7) being a steel engaging means and having, at least at its surface layer which contacts said at least one bearing element (5), greater elasticity than at its at least one underlying layer, said greater elasticity being provided by changing chemical composition of the steel forming said engaging means, whereby the elasticity of the surface layer of said engaging means (7) provides increased surface contact between said at least one bearing element (5) as said bearing element (5) is pressed with greater force against said engaging means (7) of said second coupling member (1).

2. The quick coupling connection of claim 1, wherein at the location of said at least one location of said greater elasticity, the degree of elasticity is decreased at increased depth below its surface.

3. The quick coupling connection of claim 1 wherein the surface layer has a thickness of about 0.4 to 0.8 mm and an outer layer of the surface layer has a thickness of about 0.05 to 0.4 mm.

4. The quick-coupling connection according to claim 1 wherein said engaging means is a metallic engaging means.

5. The quick-coupling connection according to claim 1 wherein said engaging mean is from the same material as the second coupling member being surface-treated for achieving greater elasticity.

6. A quick coupling for fluids at high pressure comprising:

a first female coupling member (4) and a second male coupling member (1) in close sliding relation to each other;

said male coupling member having at least one annular recess (7) of machine steel for supporting therein a plurality of substantially spherical locking members (5) to permit releasable coupling of said first and second coupling members;

said male coupling member (5) being formed from a material having a predetermined softness at an outer surface of said annular recess but having increased hardness at increased depth of said annular recess.

7. The quick coupling connection of claim 6 in which the elastic outer layer includes lead.

8. The guick coupling connection of claim 7 wherein said elastic surface layer further comprises at least carbon and manganese.

9. The quick coupling of claim 6 in which said annular recess (7) of said male coupling member (1) comprises a soft surface layer and a harder layer at increased depth of said male coupling member.

10. The quick coupling of claim 6 in which the surface layer of said annular recess (7) of said male coupling member (1) has a thickness of 0.05 to 0.4 mm.

11. A quick coupling of claim 6 wherein said material forming said annular recess includes different contents of at least one of carbon and manganese through its thickness to obtain said increasing hardness.

12. The quick-coupling connection according to claim 6 wherein said male coupling member is from the same material as said annual recess being surface-treated for achieving greater elasticity.

* * * * *